United States Patent [19]

Shimomura et al.

[11] Patent Number: 4,820,682
[45] Date of Patent: Apr. 11, 1989

[54] HEAT SENSITIVE RECORDING MATERIALS

[75] Inventors: Akihiro Shimomura; Toshimasa Usami, both of Shizuoka, Japan

[73] Assignee: Fuji Photo Film Co., Ltd., Kanagawa, Japan

[21] Appl. No.: 105,648

[22] Filed: Oct. 8, 1987

[30] Foreign Application Priority Data

Oct. 8, 1986 [JP] Japan .................................. 61-240299

[51] Int. Cl.$^4$ .............................................. B41M 5/18
[52] U.S. Cl. .................................... 503/207; 427/152; 428/331; 428/446; 428/452; 428/913; 428/914; 503/200; 503/215; 503/226
[58] Field of Search .................................. 427/150–152; 503/200, 226, 207, 215; 428/331, 446, 452, 913, 914

[56] References Cited

U.S. PATENT DOCUMENTS 4,583,103  4/1986  Hayashi et al. ...................... 503/209

FOREIGN PATENT DOCUMENTS 1291179  12/1986  Japan .................................. 503/226

Primary Examiner—Bruce H. Hess
Attorney, Agent, or Firm—Sughrue, Mion, Zinn, Macpeak & Seas

[57] ABSTRACT

This invention discloses a heat sensitive recording material having excellent transparency and anti-scratch property, which comprises on a support a heat sensitive layer and a protective layer successively, in which said heat sensitive layer is prepared by coating a composition containing an emulsified dispersion prepared by dispersing a color developer dissolved into an organic solvent slightly soluble or insoluble in water and microcapsules containing a colorless or light colored electron donating dye precursor and then drying the coat, and said protective layer is comprised of at least a modified polyvinylalcohol with silicon and a colloidal silica; a preferred mixing ratio of the modified polyvinylalcohol with silicon to the colloidal silica is 0.5–3 calculated by parts by weight.

10 Claims, No Drawings

HEAT SENSITIVE RECORDING MATERIALS

BACKGROUND OF THE INVENTION a. Field of the Invention

The present invention relates to a heat sensitive recording material, and more particularly, to a heat sensitive recording material having excellent transparency and anti-scratch property.

b. Description of the Prior Art

A heat-sensitive recording method has many advantages in that no particular developing step is required, (2) if paper is used as a support, the recording material can have a quality akin to that of plain paper, (3) handling of the recording material used is easy, (4) the images recorded have high color density, (5) this method can be effected using a simple and cheap apparatus and (6) no noise is caused during recording. Therefore, heat-sensitive recording materials have recently enjoyed a markedly increasing demand, particularly for use with a facsimile or printer, and have come to be used for many purposes.

From this situation, it has been desired to devise transparent heat-sensitive recording materials which enable direct recording with a thermal head in order to adapt them for multicolor development, or to make them usable for an overhead projector (hereafter abbreviated as OHP).

To satisfy the above desire, recently, a heat sensitive recording material having an excellent transparency was proposed which comprises a support having thereon a heat sensitive layer said heat sensitive layer being formed by coating a solution including an emulsified dispersion obtained by dispersing microcapsules containing colorless or light colored electron donating dye precursor and color developer dissolved in an organic solvent slightly soluble or insoluble in water then drying it.

On the otherhand, generally, bad chance such as being scratched is increased when a heat sensitive recording material is used for OHP or multi color recording, then a protective layer should be provided on the heat sensitive layer in practice.

However, the tranceparency of before mentioned heat sensitive layer is reduced when a protective layer is provided on the heat sensitive layer.

Therefore, more improvement on the transparency has been requested to the protective layer in order to make the heat sensitive recording material usable for OHP or to reproduce a faithful color in multi coloring.

SUMMARY OF THE INVENTION

Therefore, an object of the present invention is to provide a heat sensitive recording material having higher transparency than that of the conventional one.

The above-described object is attained with an improved heat sensitive recording material which comprises a support having thereon a heat sensitive layer and a protective layer successively, in which said heat sensitive layer is prepared by coating a composition containing an emulsified dispersion prepared by dispersing a color developer dissolved into an organic solvent slightly soluble or insoluble in water and microcapsules containing a colorless or light colored electron donating dye precursor and then drying the coat, and said protective layer is comprised of at least a modified polyvinylalcohol with silicon and a colloidal silica.

A heat sensitive recording material of the present invention has heat sensitivity high enough to enable the image formation using a thermal head of facsimile or the like, not reducing a transparency of its heat sensitive layer as well as a transparency of a protective layer. Accordingly, when a transparent film is used as the support of the present material, the resulting material can have such a usage that the material receives image information by means of facsimile, and is submitted immediately to projection with an overhead projector. Moreover, when the present material is so designed as to function as multicolor recording material, color images developed are excellent in sharpness and color reproduction and scratches are hardly seen on a surface.

DETAILED DESCRIPTION OF THE INVENTION

The modified polyvinylalcohol with silicon, which is used in the present invention is not restricted particularly if it has a silicon atom in its molecular structure, however, it is preferable in usual to use those having a substituted active group such as an alkoxyl group, an acyloxyl group, a hydroxyl group obtained by hydrolysis and so on or an alkali metal salt thereof at the silicon atom contained in the molecule.

Details of a production process of such a polyvinylalcohol having a silicon atom in its molecular structure is described in Japanese Patent Application (OPI) No. 193189/83. The polyvinylalcohol containing silicon atom in its molecule, which is used in the present invention, can also prepared by these known method.

Preferred particle size of the colloidal silica is from 10 m $\mu$ to 100 m $\mu$ and preferred specific gravity of it is from 1.1 to 1.3. In this case preferred PH value of the colloidal solution is from about 4 to about 10.

When a protective layer comprising at least above mentioned modified polyvinylalcohol with silicon and colloidal silica is prepared on a surface of a heat sensitive material, to a great surprise, a transparency of the protective layer is quite excellent, therefore a transparency of the heat sensitive material can be remarkably improved.

A proper mixing ratio of the modified polyvinylalcohol with silicon to the colloidal silica, in the present invention, is 0.5–3 parts by weight preferably 1–2 parts by weight of colloidal silica per one part by weight of modified polyvinylalcohol with silicon. If the amount of the colloidal silica is less than 0.5 part by weight, it can not bring sufficient effect for improvement on a transparency, and if it is used in an amount more than 3 parts by weight a crack occurs in the protective layer which reduces the transparency.

In the protective layer, more than one other polymers can be used together with above polymer. Some of these polymers are a methylcellulose, a carboxymethylcellulose, a hydroxymethylcellulose, a starchs, a gelatin, a gum arabic, a casein, a hydrolyzed product of styrene-maleic anhydride copolymer, a hydrolyzed half-ester product of styrene-maleic anhydride copolymer, a polyvinylalcohol, a modified polyvinylalcohol with carboxyl group, a polyacrylamide derivatives, a polyvinyl pyrrolidone, a polystyrene sodium sulfate, a water soluble polymer such as sodium alginate, styrene-butadiene rubber latex, acrylnitrile-butadiene rubber latex, methylacrylatebutadiene rubber latex, a water insoluble polymer such as polyvinylacetate emulsion. A preferred amount to be used together is from 0.01 to 0.5 part by weight per 1 part by weight of modified polyvinylalcohol with silicon.

In the protective layer, a pigment, metal soap, wax or cross-linking agent etc. can be added in order to improve matching of the heat sensitive material with thermal head when thermal recording is performed or to improve water resisting property of the protective layer.

Some of the pigments are a zinc oxide, a calcium carbonate, a barium sulfate, a titanium oxide, a lithopone, a talc, an agalmatolite, a kaolin, an aluminum hydroxide, an amorphous silica etc., an amount to be added is 0.05-2 times of an amount of total weight of polymer, especially 0.1-0.5 times are preferable. An amount less than 0.05 times can not improve the matching of the heat sensitive recording material with thermal head, on the other hand an amount more than 2 times reduces both transparency and sensitivity of heat sensitive recording material remarkably, which causes damage on commercial value.

Some of the metal soaps are an emulsion of metal salt of higher fatty acid (e.g., a zinc stearate, a calcium stearate, an aluminum stearate) etc., and its amount to be added is 0.5-20 weight %, preferably 1-10 weight % against total weight of the protective layer. Some of the waxes are a paraffin wax, a microcrystalline wax, a carnauba wax, a methylol stearoamide, a polyethylene wax, an emulsion of silicone etc., and an amount thereof to be added is 0.5-40 weight %, preferable 1-20 weight % against total weight of the protective layer.

In a coating solution for the protective layer a surface active agent is added in order to prepare the protective layer uniforming on the heat sensitive layer. Some of the active agents are an alkali metal salt of sulfosuccinic acid system and an active surface agent containing fluorine atoms etc., concretely they are a sodium salt or an ammonium salt etc., of a di-(2-ethylhexyl) sulfosuccinic acid or di-(n-hexyl) sulfosuccinic acid etc.

Other surface active agents or polymer electrolytes can also be added in the protective layer as an antistatic agent.

A preferable amount of the protective layer to be coated is usually 0.2–5 g/m², particularly 1 g–3 g/m² at the solids coverage.

Precursors of basic dyes to be employed in the present invention are selected properly from known colorless or light colored compounds of the kind which can develop their colors by donating an electron or accepting a proton of an acid or the like. These compounds have such a skeleton as that of lactone, lactam, sultone, spiropyran, ester, amide, etc., as a part of their structures, and these skeletons undergo ring-opening or bond cleavage upon contact with a color developer. Preferred examples of such compounds include triarylmethane compounds, diphenylmethane compounds, xanthene compounds, thiazine compounds, spiropyran compounds and so on.

Particularly preferred compounds are those represented by the following general formula:

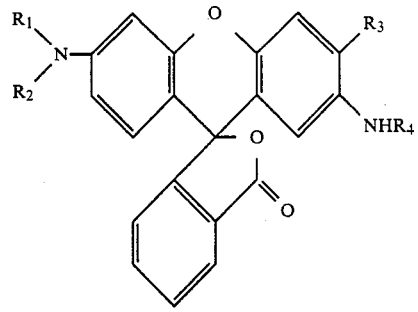

In the foregoing formula, $R_1$ represents an alkyl group containing 1 to 8 carbon atoms; $R_2$ represents an alkyl or alkoxyalkyl group containing 4 to 18 carbon atoms, or a tetrahydrofuryl group; $R_3$ represents a hydrogen atom, an alkyl group containing 1 to 15 carbon atoms, or a halogen atom; and $R_4$ represents a substituted or unsubstituted aryl group containing 6 to 20 carbon atoms. As substituent group for $R_4$, alkyl, alkoxy and halogenated alkyl groups containing 1 to 5 carbon atoms, and halogen atoms are preferred.

Microencapsulation of the above-described color former in the present invention can prevent generation of fog during production of a heat sensitive material and, at the same time, can improve a freshness keeping quality of a heat sensitive material and a keeping quality of the record formed. Therein, the image density at the time of recording can be heightened by properly selecting a material and a method for forming a microcapsule wall. A preferred amount of the color former used is 0.05 to 5.0 g per square meter.

Suitable examples of wall materials for microcapsules include polyurethane, polyurea, polyester, polycarbonate, urea/formaldehyde resin, melamine resin, polystyrene, styrene/methacrylate copolymer, styrene/acrylate copolymer, gelatin, polyvinyl pyrrolidone, polyvinyl alcohol, and so on. These macromolecular substances can be used in combination of two or more thereof in the present invention.

Of the above-cited macromolecular substances, polyurethane, polyurea, polyamide, polyester, and polycarbonate are preferred in the present invention. In particular, polyurethane and polyurea can bring about good results.

Microcapsules to be employed in the present invention are preferably prepared by emulsifying a core material containing a reactive substance like a color former, and then forming a wall of a macromolecular substance around the droplets of the core material to microencapsulate the core material. Therein, reactants to produce a macromolecular substance are added to the inside and/or the outside of the oily droplets. For details of microcapsules which can be preferably employed in the present invention, e.g., for production methods of microcapsules which can be preferably used, descriptions in Japanese Patent Application (OPI) No. 222716/84 (the term "OPI" as used herein means an "unexamined published application"), and so on can be referred to.

An organic solvent to constitute the above-described oily droplets can be properly selected from those used generally as pressure sensitive oil. In particular, the use of such an organic solvent as to be well suited for dissolution of color developers described hereinafter is desirable, because solubilities of leuco dyes therein are high, a color density of the developed image and a color development speed upon thermal printing can be increased thereby, and fog density upon thermal printing can be reduced thereby.

A preferred size of microcapsules to be employed in the present invention is 2 microns or less, particularly 1 micron or less, on a volume average basis according to the evaluation method described, e.g., in Japanese Patent Application (OPI) No. 214990/85.

Desirable microcapsules which are produced in the above-described manner are not those of the kind which are disrupted by heat or pressure, but those of the kind which have a microcapsule wall through which reactive substances present inside and outside the individual microcapsules respectively can be passed under a thermally fused condition to react with each other.

Multicolored neutral tints can be effected by preparing some kinds of microcapsules having walls differing in glass transition point through proper selection of wall materials, and optional addition of glass transition point controlling agents (e.g., plasticizers described in Japanese Patent Application No. 119862/85) to the wall materials, respectively, and further by combining selectively colorless electron donating dye precursors differing in hue with their respective color developers. Therefore, the present invention is not limited to a monochromatic heat sensitive paper, but can be applied to a two-color or multicolor heat sensitive paper and a heat sensitive paper suitable for recording of graded image.

In addition, a photodiscoloration inhibitor as described, e.g., in Japanese Patent Application Nos. 125470/85, 125471/85 and 125472/85 can be added, if desired.

Color developers to be employed in the present invention, which undergo the color development reaction with basic colorless dyes in a thermally fused condition, can be those selected properly from known color developers. For instance, suitable examples of color developers to be combined with leuco dyes include phenol compounds, triphenylmethane compounds, sulfur-contained phenolic compounds, carboxylic acid compounds, sulfon compounds, urea or thiourea compounds, and so on. Details of the color developers are described, e.g., in "Kami Pulp Gijutsu Times, pp. 49–54, and pp. 65–70 (1985)". Of such color developers, those having melting points of 50° to 250° C., particularly phenols and organic acids which have melting points of 60° to 200° C. and are hardly soluble in water, are preferred over others. Combined use of two or more of color developers is desirable because of increase in solubility.

Color developers preferred particularly in the present invention are represented by the following general formulae (I) to (IV):

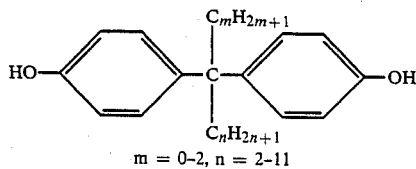

$m = 0-2, n = 2-11$

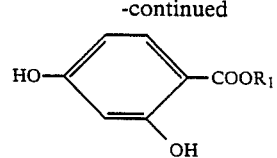

$R_1$ is an alkyl group, an aryl group, or an aralkyl group. In particular, methyl group, ethyl group and butyl groups are preferred as $R_1$.

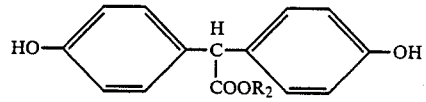

$R_2$ is an alkyl group. In particular, butyl group, pentyl group, heptyl group, and octyl group are preferred as $R_2$.

$R_3$ is an alkyl group, or an aralkyl group.

In the present invention, such a color developer is used in a form of emulsified dispersion. The dispersion can be prepared by dissolving color developers in an organic solvent slightly soluble or insoluble in water, and mixing the resulting solution with an aqueous phase which contains a surface active agent, and a water-soluble high polymer as a protective colloid to emulsify and to disperse the solution in the aqueous phase.

An organic solvent to be used for dissolving the color developers can be properly selected from known oils. Especially, esters and oils having more than 2 benzene rings and containing less than a certain numbers of hetero atoms are preferred. Examples of the latter oils include compounds represented by the following general formula (V) to (VII), triarylmethanes (such as tritoluylmethane, toluyldiphenylmethane), terphenyl compounds (such as terphenyl), alkylated diphenyl ethers (such as propyldiphenyl ether), hydrogenated terphenyl compounds (such as hexahydroterphenyl), diphenyl ethers, and so on.

Of these oils, esters are particularly preferred in the present invention from standpoints of stabilization of emulsified dispersion of the color developers and dissolving ability for the color developers.

Specific examples of esters include phosphates (e.g., triphenyl phosphate, tricresyl phosphate, butyl phosphate, octyl phosphate, cresyl-bi-phenyl phosphate), phthalates (e.g., dibutyl phthalate, 2-ethylhexyl phthalate, ethyl phthalate, octyl phthalate, butylbenzyl phthalate, tetrahydro dioctyl phthalate, benzoates (e.g., ethyl benzoate, propyl benzoate, butyl benzoate, isopentyl benzoate, benzyl benzoate), abietates (e.g., ethyl abietate, benzyl abietate ), dioctyl adipate, isodecyl succinate, dioctyl azelate, oxalates (e.g., dibutyl oxalate, dipentyl oxalate), diethyl malonate, maleates (e.g., dimethyl maleate, diethyl maleate, dibutyl maleate), tributyl citrate, sorbic esters (methyl sorbate, ethyl sorbate, butyl sorbate), sebacic esters (dibutyl sebacate, dioctyl sebacate), ethyleneglycol esters (e.g., formic acid monoesters and diesters, butyric acid monoesters and diesters, lauric acid monoesters and diesters, palmitic acid monoesters and diesters, stearic acid monoesters and diesters, oleic acid monoesters and diesters), triacetin, diethylcarbonate, diphenylcarbonate, ethylenecarbonate, propylenecarbonate, boric acid esters (e.g., tributyl borate, tripentyl borate ). Of these esters, it is particularly preferred to use tricresyl phosphate from the standpoint of stabilization of emulsified dispersion of the color developers.

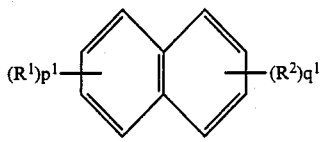
(V)

In the above formula, $R^1$ represents a hydrogen atom or an alkyl group containing 1 to 18 carbon atoms; $R^2$ represents an alkyl group containing 1 to 18 carbon atoms; and $p^1$ and $q^1$ each represents an integer of 1 to 4, provided that the total number of alkyl groups therein is 4 or less. Preferred alkyl groups represented by $R^1$ and $R^2$ are those containing 1 to 8 carbon atoms.

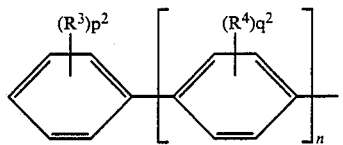
(VI)

In the above formula, $R^3$ represents a hydrogen atom, or an alkyl group containing 1 to 12 carbon atoms; $R^4$ represents an alkyl group containing 1 to 12 carbon atoms; and n is 1 or 2. $p^2$ and $q^2$ each represents an integer of 1 to 4. The total number of alkyl groups is 4 or less in case of n=1, while it is 6 or less in case of n=2.

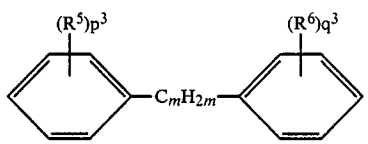
(VII)

In the above formula, $R^5$ and $R^6$, which may be the same or different, each represents a hydrogen atom, or an alkyl group containing 1 to 18 carbon atoms. m represents an integer of 1 to 13. $p^3$ and $q^3$ each represents an integer of 1 to 3, provided that the total number of alkyl groups is 3 or less.

Of alkyl groups represented by $R^5$ and, $R^6$, those containing 2 to 4 carbon atoms are particularly preferred.

Specific examples of the compounds represented by the formula (V) include dimethylnaphthalene, diethylnaphthalene, diisopropylnaphthalene, and the like.

Specific examples of the compounds represented by the formula (VI) include dimethylbiphenyl, diethylbiphenyl, diisopropylbiphenyl, diisobutylbiphenyl, and the like.

Specific examples of the compounds represented by the formula (VII) include 1-methyl-1-dimethylphenyl-1-phenylmethane, 1-ethyl-1-dimethylphenyl-1-phenylmethane, 1-propyl-1-dimethylphenyl-1-phenylmethane, and the like.

The above-cited oils can be used as a mixture of two or more thereof, or in combination with other oils.

Further, auxiliary solvents, which have low boiling points and act as dissolution aid, can be added to the foregoing organic solvents in the present invention. As examples of particularly preferred auxiliary solvents, mention may be made of ethyl acetate, isopropyl acetate, butyl acetate, methylene chloride, and the like.

Water soluble high polymers to be contained as a protective colloid in an aqueous phase, which is to be mixed with an oily phase wherein color developers are dissolved, can be selected properly from known anionic, nonionic or amphoteric high polymers. Of these high polymers, polyvinylalcohol, gelatin, cellulose derivatives and the like are preferred.

Surface active agents to be contained additionally in the aqueous phase can be selected properly from anionic or nonionic surface active agents of the kind which do not cause any precipitation or condensation by interaction with the above-described protective colloids. As examples of surface active agents which can be preferably used, mention may be made of sodium alkylbenzenesulfonates (such as sodium laurylbenzenesulfonate), sodium dioctylsulfosuccinates, polyalkylene glycols (such as polyoxyethylene nonylphenyl, ether) and so on.

An emulsified dispersion of color developers to be used in the present invention can be prepared with ease by mixing an oily phase containing the color developers and an aqueous phase containing a protective colloid and a surface active agent with a general means for preparing a fine grain emulsion, such as a high-speed stirrer, an ultrasonic disperser or so on, to disperse the former phase into the latter phase.

To the emulsified dispersion thus obtained, melting point depressants for the color developers can be added, if desired. Some of these melting point depressants have such a function as to control glass transition points of the capsule walls described hereinbefore, too. Specific examples of such melting point depressants include hydroxy compounds, carbamate compounds, sulfonamide compounds, aromatic methoxy compounds and so on. Details of these compounds are described in Japanese Patent Application No. 244190/84.

These melting point depressants can be used in an amount of 0.1 to 2 parts by weight, preferably 0.5 to 1 part by weight, per 1 part by weight of color developer whose melting point is to be depressed. It is to be desired that the melting point depressant and the color developer, whose melting point can be depressed thereby, should be used in the same place. When they are added to separate places, a preferred addition amount of the melting point depressant is 1 to 3 times of that of the above-described one.

For the purpose of prevention of sticking to a thermal head, and improvement on writing quality, pigments such as silica, barium sulfate, titanium oxide, aluminium hydroxide, zinc oxide, calcium carbonate, etc., styrene beads, or fine particles of urea/melamine resin and so on can be added to the heat sensitive recording material of the present invention. In order to keep the transparency of the heat sensitive layer, it is to be desired that the above-described pigments and so on should be added to a protective layer which is provided on the heat sensitive layer in a conventional manner for the purpose of acquisition of keeping quality and stability. Details of the protective layer are described in "Kami Pulp Gijitsu Times", pp. 2 to 4 (Sept. 1985).

Also, metal soap can be added for the purpose of prevention of the sticking phenomenon. They are used at a coverage of 0.2 to 7 g/m².

The heat sensitive recording material of the present invention can be formed using a coating technique with the aid of an appropriate binder.

As for the binder, various kinds of emulsions, such as a polyvinyl alcohol emulsion, a methyl cellulose emulsion, a carboxymethyl cellulose emulsion, a hydroxypropyl cellulose emulsion, a gum arabic emulsion, a gelatin emulsion a polyvinyl pyrrolidone emulsion, a casein emulsion, a styrene-butadiene latex, an acrylonitrile-butadiene latex, a polyvinyl acetate emulsion, a polyacrylate emulsion, an ethylene-vinyl acetate copolymer emulsion, and so on, can be employed. An amount of the binder used is 0.2 to 5 g per square meter on a solids basis.

The heat sensitive recording material of the present invention is produced by providing a heat sensitive layer on a support, such as paper, a synthetic resin film, etc., coating and drying a coating composition, in which microcapsules enclosing a color former therein and a dispersion containing at least a color developer in an emulsified condition are contained as main components, and further a binder and other additives are incorporated, according to a conventional coating method, such as a bar coating method, a blade coating method, an air knife coating method, a gravure coating method, a roll coating method, a spray coating method, a dip coating method, or so on. A coverage of the heat sensitive layer is controlled to 2.5 to 25 g/m² on a solids basis. It is a surprise to find that thus prepared heat sensitive layer has very excellent transparency, though the reason for its transparency is not elucidated yet.

As for the paper to be used as a support, neutralized paper which is sized with a neutral sizing agent like an alkylketene dimer and shows pH 6-9 upon hot extraction (Japanese Patent Application (OPI) No. 14281/'80) is employed to advantage in the respect of long-range preservation.

In order to prevent the penetration of a coating composition into paper, and in order to effect a close contact between a heat recording head and a heat sensitive recording layer, paper described in Japanese Patent Application (OPI) No. 116687/82, which is characterized by Stokigt sizing degree/(meter basis weight)² ≧ 3 × 10⁻³ and Bekk smoothness of 90 seconds or more, is used to advantage.

In addition, paper having optical surface roughness of 8 microns or less and a thickness of 40 to 75 microns, as described in Japanese Patent Application (OPI) No. 136492/83; paper having a density of 0.9 g/cm³ or less and optical contact rate of 15% or more, as described in Japanese Patent Application (OPI) No. 69097/83; paper which is prepared from pulp having received a beating treatment till its freeness has come to 400 cc or more on a basis of Canadian Standard Freeness (JIS P8121) to prevent permeation of a coating composition thereinto, as described in Japanese Patent Application (OPI) No. 69097/83; raw paper made with a Yankee paper machine, which is to be coated with a coating composition on the glossy side and thereby, improvements on developed color density and resolution are intended, as described in Japanese Patent Application (OPI) No. 65695/83; raw paper which has received a corona discharge processing and thereby, its coating aptitude has been enchanced, as described in Japanese Patent Application (OPI) No. 35985/84; and so on can be employed in the present invention, and can bring about good results. In addition to the above-described papers, all supports which have so far been used for general heat sensitive recording papers can be employed as the support of the present invention.

In the present invention, back layer may be employed behind the support in order to improve properties such as curling, antistatic and smoothness. As for components of the back layer it is desired to use similar one utilized in the protective layer.

EXAMPLES

The present invention is illustrated in greater detail by reference to the following examples. However, the invention should not be construed as being limited to these examples.

(Preparation of Capsule Solution)

14 g of Crystal Violet lactone (leuco dye), 60 g of Takenate D 110N (Trade name of capsule wall material, produced by Takeda Yakuhin K.K. ) and 2 g of Sumisoap 200 (Trade name of ultraviolet absorbent, produced by Sumitomo Kagaku K.K.) were added to a mixed solvent consisting of 55 g of 1-phenyl-1-xylylethane and 55 g of methylene chloride, and dissolved therein. The solution of the above-described leuco dye was mixed with an aqueous solution constitued with 100 g of a 8% water solution of polyvinyl alcohol, 40 g of water and 1.4 g of a 2% water solution of sodium dioctylsulfosuccinate (dispersant), and emulsified with stirring at 10,000 r.p.m. for 5 minutes using Ace Homogenizer made by Nippon Seiki K.K.. Then, the resulting emulsion was diluted with 150 g of water, and allowed to stand at 40° C. for 3 hours to conduct the microencapsulation reaction therein. Thus, a solution containing microcapsules having a size of 0.7 micron was obtained.

(Preparation of Color Developer-emulsified Dispersion)

The color developers (a), (b) and (c) represented by the structural formulae illustrated below were added in amounts of 8 g, 4 g and 30 g, respectively, to a solvent mixture of 8.0 g 1-phenyl-1-xylylethane and 30 g of ethyl acetate, and dissolved thereinto. The thus obtained solution of the color developers was mixed with 100 g of a 8% water solution of polyvinyl alcohol, 150 g of water and 0.5 g of sodium dodecylbenzensulfonate, and emulsified with stirring at 10,000 r.p.m. for 5 minute at ordinary temperature using Ace Homogenizer made by Nippon Seiki k.k. to prepare an emulsified dispersion having a grain size of 0.5 micron.

Color Developer (a)

Zinc Salt of

-continued

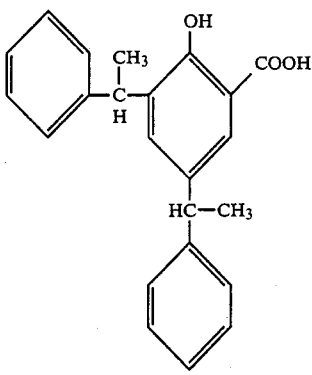

Color Developer (b)

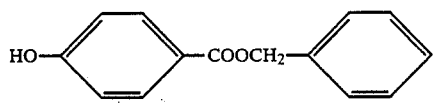

Color Developer (c)

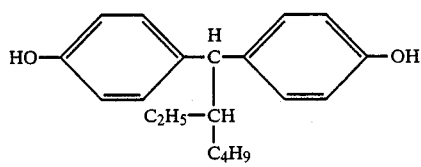

Production of Heat Sensitive Material No. 1

A 5.0 g portion of the foregoing capsule solution, a 10.0 g portion of the foregoing color developer-emulsified dispersion and 5.0 g of water were mixed with stirring, coated on a 70μ-thick transparent polyethylene terephthalate (PET) film support at a coverage of 15 g/m² on a solids basis, and dried. Thereon, a 2μ-thick protective layer having the following composition was further provided to produce a transparent heat sensitive film.

| (Composition of Protective Layer) | |
|---|---|
| Modified Polyvinylalcohol with silicon (PVA R2105: manufactured by Kurare K.K.) | 1 weight part (solid basis) |
| Colloidal silica (Snowtex 30: manufactured by Nissan Kagaku K.K.) | 1.5 weight part (solid basis) |
| Zinc stearate (Hidolin Z-7: manufactured by Chukyo Yushi K.K.) | 0.02 weight part (solid basis) |
| Paraffin Wax (Hidolin P-7: manufactured by Chukyo Yushi K.K.) | 0.02 weight part (solid basis) |

Production of heat sensitive material No. 2

A sample No. 2 was obtained in the same manner as in sample No. 1 except that the components of the protective layer were changed as follows.

| | |
|---|---|
| Modified Polyvinylalcohol with silicon (PVA R2105: manufactured by Kurare K.K.) | 1 weight part (solid basis) |
| Colloidal silica (Snowtex 30: manufactured by Nissan Kagaku K.K.) | 1.8 weight part (solid basis) |
| Amorphous silicon (P-832: manufactured by Mizusawa Kagaku K.K.) | 0.1 weight part (solid basis) |
| Zinc stearate (Hidolin Z-7: manufactured by Chukyo Yushi K.K.) | 0.02 weight part (solid basis) |

Production of heat sensitive material (Comparison-1)

A sample (Comparison-1) was prepared in the same manner as in sample No. 1 except using a polyvinyl alcohol (PVA 217: manufactured by Kurare K.K.) instead of the modified polyvinylalcohol with silicon which was employed as one of components of the protective layer of sample No. 1.

Production of heat sensitive material (Comparison-2)

A sample (Comparison-2) was prepared in the same manner as in sample No. 1 except that the colloidal silica employed as one of components of the protective layer of sample No. 1 was not used.

Production of heat sensitive material (Comparison-3)

A sample (Comparison-3) was prepared in the same manner as in sample No. 1 except that the colloidal silica and the modified polyvinylalcohol with silicon which were employed as the components of the protective layer of sample No. 1 were not used and an oxidized starch (MS 3800: manufactured by Nishoku K.K.) was used instead of the latter.

Production of heat sensitive material (Comparison-4)

A sample (Comparison-4) was prepared in the same manner as in sample No. 2 except that the colloidal silica employed as one of components of the protective layer of sample No. 2 was not used.

Production of heat sensitive material (Comparison-5)

A sample (Comparision-5) was prepared in the same manner as in sample No. 2 except that a half ester salt of styrene-maleic acid copolymer (Polymaron 385: manufactured by Arakawa Kagaku K.K.) was used instead of the modified polyvinylalcohol by silicon which was used as one of the components of the protective layer of sample No. 2.

Production of heat sensitive material (Comparison-6)

A sample (Comparision-6) was prepared in the same manner as in sample No. 2 except that the colloidal silica and the modified polyvinylalcohol with silicon which were employed as the components of the protective layer of sample No. 2 were not used and a polyvinyl alcohol (PVA 217: manufactured by Kurare K.K.) was used instead of the latter.

The result of measurements of Haze (%) on above prepared samples using HTR meter (integrating-sphare photometer) manufactured by Nippon Seimitsu Kogyo K.K. were shown in the following table.

| Sample | Haze (%) |
|---|---|
| No. 1 | 16 |
| No. 2 | 17 |
| Comparison-1 | 40 |
| Comparison-2 | 42 |
| Comparison-3 | 47 |
| Comparison-4 | 39 |
| Comparison-5 | 38 |
| Comparison-6 | 40 |

From the above results, it was proved that the heat sensitive recording material of the present invention realized an excellent transparency.

What is claimed is:

1. A heat sensitive recording material which comprises on a transparent support a heat sensitive layer and a protective layer successively, in which said heat sensitive layer is prepared by coating a composition containing an emulsified dispersion prepared by dispersing a color developer dissolved into an organic solvent slightly soluble or insoluble in water and microcapsules containing a colorless or light colored electron donating dye precursor and then drying the coat, and said protective layer is comprised of at least a polyvinyl alcohol modified with silicon and a colloidal silica.

2. A heat sensitive recording material as claimed in claim 1, wherein said polyvinyl alcohol modified with silicon is those having on a silicon atom at least one group selected from an alkoxyl group, and acyloxyl group, a hydroxyl group obtained by hydrolysis and an alkali metal salt thereof.

3. A heat sensitive recording material as claimed in claim 1, wherein particle size of said colloidal silica is from 10 m$\mu$ to 100 m$\mu$.

4. A heat sensitive recording material as claimed in claim 3, wherein specific gravity of said colloidal silica is from 1.1 to 1.3.

5. A heat sensitive recording material as claimed in claim 1, wherein the wall material of said microcapsule is a macromolecular substance selected from a group of a polyurethane, a polyurea, a polyamide, a polyester and a polycarbonate.

6. A heat sensitive recording material as claimed in claim 5, wherein said macromolecular substance is either polyurethane or the polyurea.

7. A heat sensitive recording material as claimed in claim 1, wherein a diameter of the microcapsule is less than 2 microns.

8. A heat sensitive recording material as claimed in claim 7, wherein the diameter of the microcapsule is less than 1 micron.

9. A heat sensitive recording material as claimed in any one of preceding claims, wherein a mixing ratio of the polyvinyl alcohol modified with silicon to the colloidal silica is 0.5-3 calculated by parts by weight.

10. A heat sensitive recording material as claimed in claim 9, wherein said mixing ratio is from 1 to 2.

* * * * *